3,457,703
Patented July 29, 1969

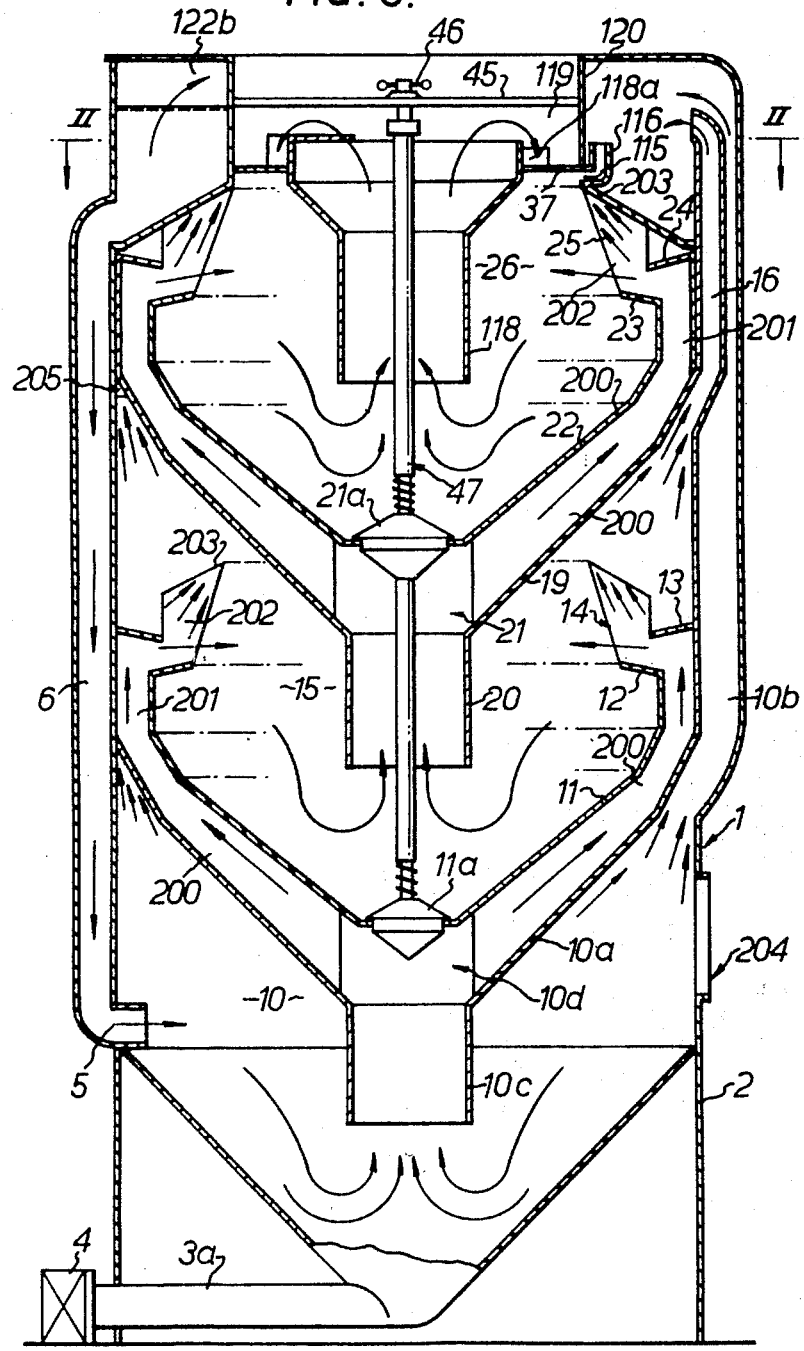

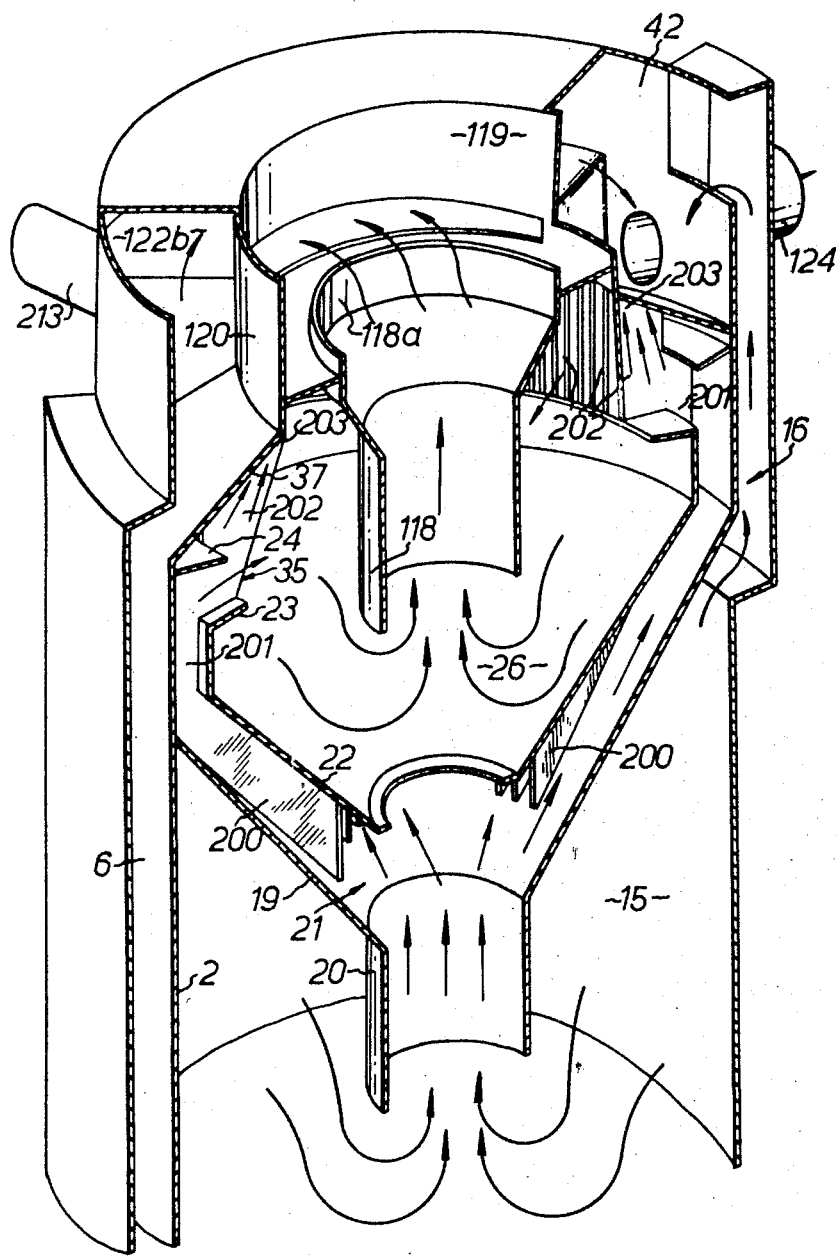

1

3,457,703
METHOD AND APPARATUS FOR SEPARATING
WATER-HYDROCARBON MIXTURES
Philippe J. Cheysson, Sainte Adresse, Seine-Maritime,
France, assignor to Esso Research and Engineering
Company, a corporation of Delaware
Filed Oct. 27, 1965, Ser. No. 505,348
Claims priority, application France, Oct. 29, 1964,
993,223; Feb. 26, 1965, 7,199; July 2, 1965, 23,361
Int. Cl. B01d 19/02
U.S. Cl. 55—45                                    19 Claims

ABSTRACT OF THE DISCLOSURE

The separator construction includes a plurality of series connected separating stages wherein mixtures of liquids having different densities, for example, a mixture of water and hydrocarbon, progresses sequentially through a plurality of conical downwardly sloping trays spaced vertically apart which define a vertical water passage and outlet, and wherein discharge outlets are provided near the uppermost portion of each tray connecting with a common oil separation outlet, the height of the exit of said oil separation outlet being elevated above the water outlet.

The present invention is concerned with a new gravity separator with automatic or semi-automatic operating control, which is more especially intended for the separation of brine and liquid hydrocarbons.

The separator according to the invention has the advantage of providing, by an arrangement of several superimposed separating stages, automatic or semi-automatic recovery of the hydrocarbons. Moreover, the special arrangement of the different parts forming the separator makes it possible, under the same running conditions, to reduce the dimensions considerably, which enables it to be installed for instance onboard vessels.

According to the invention, the separator comprises an outer jacket, e.g. of cylindrical shape, a plurality of downwardly sloping trays, preferably conical shaped, spaced vertically apart, and arranged in pairs one above each other. Associated with the periphery of the upper tray of each pair of trays there is a passageway through which liquid can flow from the underside of said upper tray to the space above said tray, and the lower tray of each pair of trays has an aperture, (preferably in the form of a funnel), in the lower region thereof, and the trays are spaced so that the level of each passageway is above the level of the aperture of the tray above. The lower tray of each pair of trays is sealingly connected to the outer jacket and discharge outlets are provided for communicating the interior of the jacket near the underside of each lower tray with the outside of the jacket. There is a feed inlet positioned so that incoming liquid is fed in at a level below the lower tray of the lowest pair of trays, and there is an upper outlet for liquid positioned above the upper tray of the uppermost pair of trays, but preferably below the level of the passageway associated therewith.

For optimum operation of the separator, the feedstream is removed of air and other gases before being introduced to the space below the lower tray of the lowest pair of trays. The feed inlet can be connected to a deaerator which is preferably situated at the top of the separator, being connected to the feed inlet by means of a conduit extending substantially throughout the height of the separator. The feed inlet is generally positioned so that it is above the level of the aperture in the lower tray of the lowest pair of trays.

In the preferred embodiment of the separator, the outer jacket is cylindrical, and the trays are conically shaped.

2

These conically shaped trays which usually terminate in a funnel, are generally inclined at approximately 45° to the vertical. In this preferred embodiment the passageways associated with the periphery of each upper tray are annular spaces between the perimeter of the tray and the outer jacket.

In order to enable one to remove deposits and sediments which collect from time to time and to facilitate removal of liquid from the separator, the lower region of the upper tray of each pair of trays preferably terminates in a valve. These valves may be connected together and operated by a hand control.

The upper outlet positioned above the upper tray of the uppermost pair of preferably an upwardly extending funnel. The upper part of the funnel near the top thereof can be sealingly connected to a transversely extending partition which is itself sealingly connected to the outer jacket. With this arrangement the liquid flows upwardly over the top of the funnel, which thereby acts as a weir, and then over the partition and out of the separator through a further outlet provided for the purpose.

Each discharge outlet, communicating the interior of the jacket with the exterior thereof, is preferably separately connected to a separate conduit extending upwardly above the outlet. The orifices or outlets of these conduits are at different levels (near the top of the separator) so that the liquid flowing in these conduits and out through the orifices is in hydrostatic balance with the liquid flowing out of the upper outlet. This means that when oil is being separated from water, water will flow out of the upper outlet, and oil out of the orifices. These orifices will be arranged at different levels, such that the orifice at the highest level is that of the conduit connected to the lowest discharge outlet. The next highest orifice will be that of the conduit connected to the second lowest discharge outlet, and so on.

If desired these upwardly extending conduits may be heated by steam pipes passing through the upper parts of the conduits.

In further improvements of the apparatus of the invention, there is a sediment trap upstream of the feed inlet, and a collector passage at the top of the separator. The sediment trap can be at the top of the separator and can be a transverse partition extending part of the way up from the bottom of the conduit through which the feed passes. The collector passage comprises as an inlet, a weir which is positioned adjacent to the top of the conduit connected to the feed inlet. In this manner any feed liquid already separated by gravity passes over the weir into the collector passage and the remainder of the feed liquid passes into the feed inlet via the conduit.

In one form of the apparatus, the passageways associated with the perimeter of each upper tray which can extend continuously around the perimeter of the tray, preferably terminate in a diffuser. The diffuser may comprise deflector shaped members transverse to the outer jacket, e.g. they may be annular strips, one a flanged edge secured to the cylindrical outer jacket, and the other a flanged edge secured to the periphery of a conical tray.

In order to increase the separation characteristics of each stage of the separator, in addition to the use of gravity separation, use can be made of surface tension effect. Thus the separator may have diffuser elements comprising a series of inwardly directed strips fixed to the perimeter of the upper trays. These strips are preferably set at an angle to the line joining the strip with the central axis of the separator, so that liquid flowing between the strips undergoes a helical flow into the space above the upper trays. With such diffuser elements, there is preferably a filter unit in the space between the uppermost passageway and the upper outlet. The filter unit can comprise a series of baffle plates between which the liquid passes in flowing towards the centre of the separator.

In another embodiment of the invention, the surface tension effect, is achieved by the use of a plurality of centrally directed blades in the spaces between the upper and lower tray of each pair of trays, said blades extending upwardly and inwardly into the spaces below the lower tray of each pair of trays, each blade terminating at a point close to the underside of a lower tray.

In accordance with the invention therefore, a mixture of liquids of different densities may be separated by a method in which said mixture is continuously fed into the lowest separation stage of a separator comprising a plurality of separation stages, each stage being bounded by a separate pair of downwardly sloping trays spaced vertically apart, and in which at each separation stage (1) The lighter liquid which separates is allowed to rise up and to pass out of the separator through a discharge outlet positioned near the top of the separation stage, and (2) The denser liquid which separates is allowed to pass through an aperture in the lowest part of the tray forming the upper boundary of the separation stage, and thereafter to pass through the space between two separation stages and to enter the next separation stage above through a passageway which is associated with the periphery of a tray and which is positioned at a level above the aperture in the tray forming the upper boundary of said next separation stage, and in which at the top separation stage the separated denser liquid is removed through an upper outlet.

Various other characteristics of the invention will moreover emerge from the detailed description which follows:

One form of the apparatus of the invention is now described with reference to FIGURES 1 and 2 of the accompanying drawings.

Figure 1:
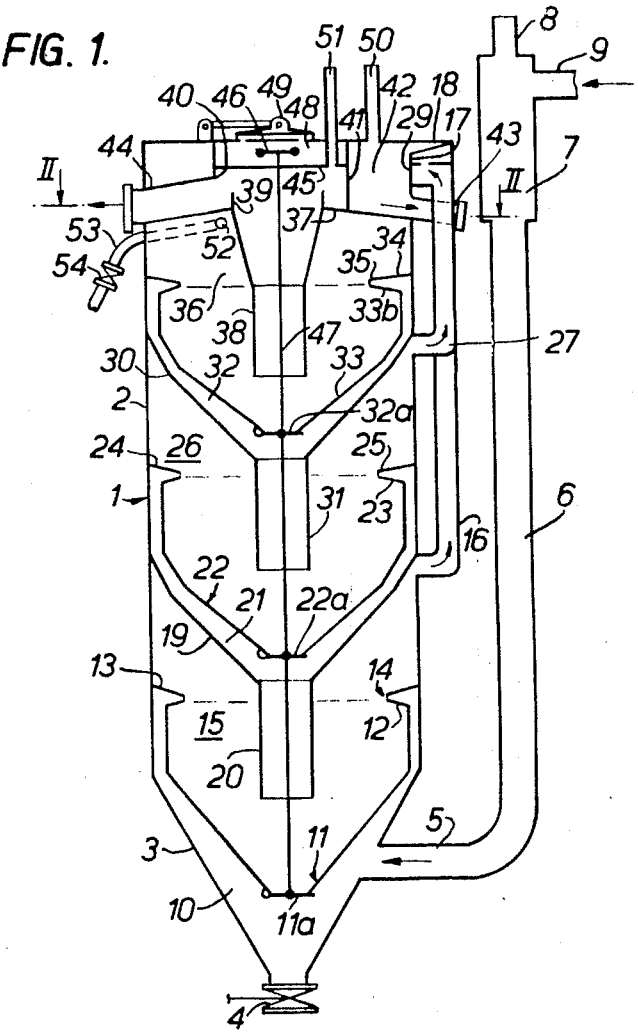
FIGURE 1 is a diagrammatic elevation and section of the separator according to the invention.
Figure 2:
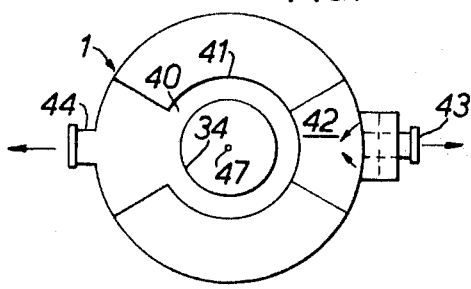
FIGURE 2 is a transverse section substantially along the line II—II of FIGURE 1.

According to the drawing, the separator consists of a cylindrical tank 1 with a vertical axis, bounded by a jacket 2. The lower part of this jacket is prolonged by a truncated cone bottom 3 protruding outwardly, and whose small base is fitted with a manually operated valve 4, whose function is described below.

The bottom 3 is connected with an intake pipe 5 with tangential opening which connects with a balancing column 6 parallel to the longitudinal axis of the separator 1. This balancing column is connected to the outlet of a ventilating device 7 having an exhaust flue 8 and a supply pipe 9 on which is mounted a device, not shown, for pumping the mixture to be treated.

The intake pipe 5 ends tangentially in the transverse median zone of an annular chamber 10, which is arranged between the bottom 3 and truncated conical tank 11, whose diameter is less than that of the jacket 2. The circular peripheral part of the tank 11 has a flanged edge 12 which co-operates with an annular deflector 13 offset on the inner surface of the jacket 2 to constitute a diffuser 14. The latter provides a communication between the annular chamber 10 and a container 15 bounded by the tank 11 and the jacket 2 to form the first stage of separation. This stage connects at its upper level with a pipe 16 which terminates in a baffle 17 at the top part of the separator formed by an upper wall 18. The first stage of separation 15 is moreover bounded by an intermediate partition in the form of a truncated cone 19 which is positioned inside the jacket 2 immediately above the orifice of the pipe 16. The cone 19 is prolonged from its small base by a cylindrical funnel 20 opening substantially into the same median zone of the tank 11 so that the first separating stage 15 communicates with an annular chamber 21 arranged between the cone 19 and a superimposed tank 22 in the form of a truncated cone. In much the same way as in the tank 11, the tank 22 has a flanged edge 23 which acts in conjunction with an annular deflector 24 offset on the jacket 2 to form a diffuser 25 opening into a container 26 bounded by the tank 22 and the corresponding part of the jacket 2 to constitute a second stage of separation. This second stage is connected to a pipe 27 which terminates in a baffle 29 at the upper part of the separator 1, but at a level immediately below that of the baffle 17 of the pipe 16 emerging from the first stage of separation.

The second stage 26 is moreover bounded at the upper part by an intermediate partition in the form of a truncated cone 30 which is positioned inside the jacket 2, immediately above the orifice of the pipe 27. The cone 30 is prolonged like the partition 19 by a cylindrical funnel 31 which opens in the median zone of the container 22. This funnel causes the second stage 26 to communicate with an annular chamber 32 provided between the cone 30 and the truncated conical tank 33, in much the same way as tanks 11 and 22. Like the latter, the tank 33 has a flanged edge 33b, which acts in conjunction with an annular deflector 34 offset on the jacket 2 to bound a diffuser 35 connecting the annular chamber 32 with a container 36 bounded by the tank 33 and the corresponding part of the jacket 2 to form the last stage of separation. This stage is blocked at its upper part by an intermediate partition 37 which has in its median zone a cylindrical funnel 38 ending in the median zone of the tank 33. The orifice of the funnel 38 on a level with the partition 37 is bounded by a weir 39 which opens in the middle of a higher tank 40 bounded by a cylindrical sleeve 41 fixed to the intermediate partition 37 and extending as far as the upper wall 18 of the separator. This sleeve 41 is moreover provided to isolate the container 40 from a spout 42 terminating in a discharge pipe 43 and in which the baffles 17 and 29 of the pipes 16 and 27 terminate. The container 40, which also has a discharge pipe 44, is blocked by an upper wall 45 on which is mounted a hand control 46. This control actuates a set of rods 47 which control simultaneously three valves 11a, 22a, 32a, closing the small bases of the relevant truncated cones. The manual control 46 is accessible by an opening 48 made in the upper wall 18 of the separator and normally closed by a cover 49. 50 and 51 denote pipes for communication with the open air fitted to the spot 42 and the container 40.

The separator described above operates as follows:

The mixture to be purified is taken by the pipe 9 to the deaerator 7 in which it is rid of the air and the gases that may have been pumped, and these are discharged through the pipe 8. The mixture thus freed then passes through the balancing column 6 and the intake pipe 5, entering the annular chamber 10, in which it is subjected to a spiral movement. This mixture then enters the first stage 15 through the diffuser 14 which ensures dispersion by conical projection under turbulent conditions. This dispersion brings about an initial separation by gravity of the water and liquid hydrocarbons which, owing to their lower density, tend to accumulate in the upper part of the separating stage 15. These hydrocarbons are thus caused gradually to use the pipe 16, emptying through the baffle 17 into the spout 42, passing through the discharge pipe 43 to a storage tank (not shown).

The water that has undergone initial treatment in the lower stage 15 tends to use, through the effect of the continuous arrival of the mixture to be treated delivered by the diffuser, the funnel 20 and the annular chamber 21. This water therefore enters the second stage 26 through the diffuser 25, which ensures a second separation of water, in much the same way as that carried out in the stage 15. The hydrocarbons separated in the stage 26 pass through the pipe 27 and empty through the baffle 29 into the discharge spout 42. The water held back in the tank 22, after this second treatment, follows the funnel 31 passing with the annular chamber 32 leading to the third separating stage 36. In much the same way, the diffuser 35 connecting the chamber 32 and the third stage 36, ensures a dispersion, whose effect it is to separate the residual hydrocarbons still contained in the water that has undergone two consecutive treatments. These hydrocarbons, the quantity of which is small, are discharged at the upper part through an outlet 52 connecting the stage 36, with an outflow pipe 53, having a hand control valve 54. The purified water, emerging from the third stage of separation 36, passes through the funnel 38 to be discharged by the pipe 44.

It should be pointed out that the weir 39 is situated at a lower level that that of the baffles 29 and 17, so that the weight of the columns of water acting on the level of each stage of separation tends further to accelerate further the discharge of the separated hydrocarbons accumulating in the upper part of every separating stage.

Any deposits can be held back on a level with every separating stage, in particular in the corresponding tanks, and are discharged periodically, after stopping the device feeding the separator, by means of the hand control 46, which is driven in such a way as to open the valves 11a, 22a and 32a. The deposits present in the superimposed tanks then follow, in the opposite direction of the flow of the mixture to be treated, the funnels 20 and 31 of the intermediate partitions to accumulate on a level with the bottom 3 of the jacket 2, from which they can finally be discharged by means of the valve 4.

As will appear from the drawing and the description given above, the separator according to the invention has the considerable advantage coupled with relatively small dimensions, of subjecting the mixture to be treated to three consecutive separating operations, making it possible to obtain the almost complete elimination, by semi-automatic means, of the hydrocarbons contained in the cleaning water of tanks, for instance in certain tankers conveying petroleum products.

Figure 3:
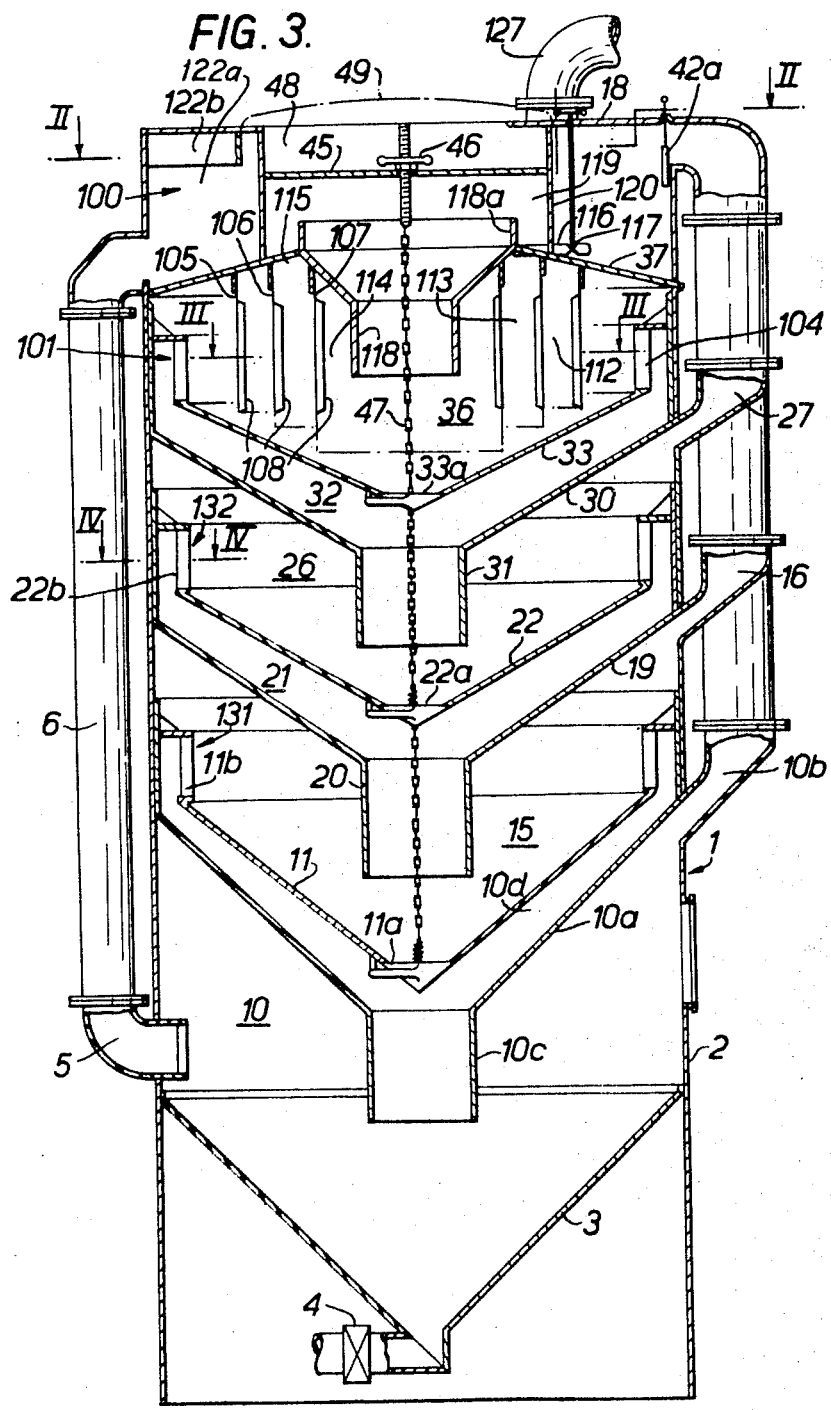

Another embodiment of the apparatus is described with reference to FIGURES 3 to 7 of the accompanying drawings, in which:

FIGURE 3 is a diagrammatic elevation in section of the separator.

Figure 4:
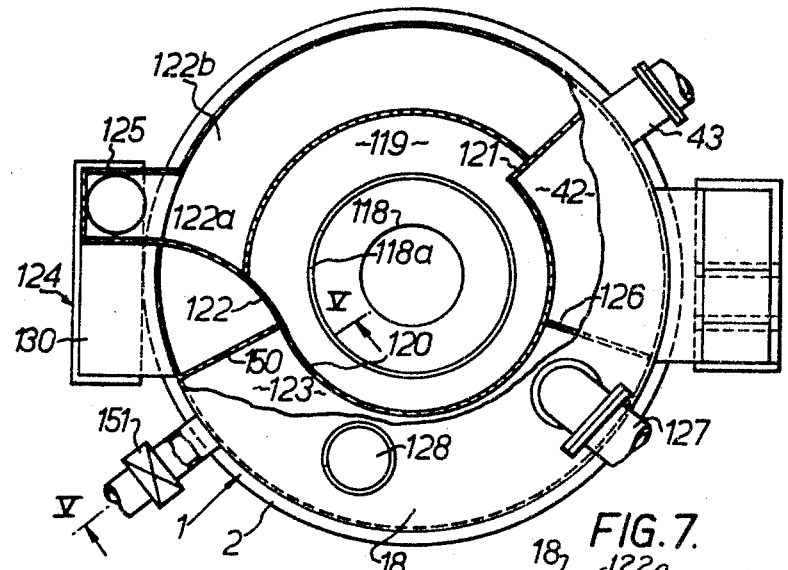

FIGURE 4 is a transverse section substantially along the line II—II of FIGURE 3.

Figure 5:
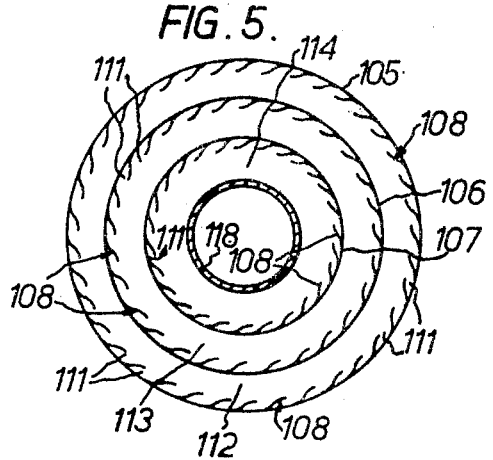

FIGURE 5 is a cross-section showing the special execution of one of the components forming the separator substantially along the line IV—IV of FIGURE 3.

Figure 6:
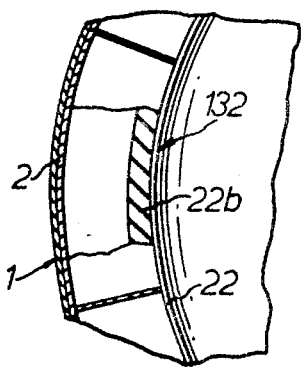

FIGURE 6 is a partial cross-section on a larger scale, substantially along the line III—III of FIGURE 3.

Figure 7:
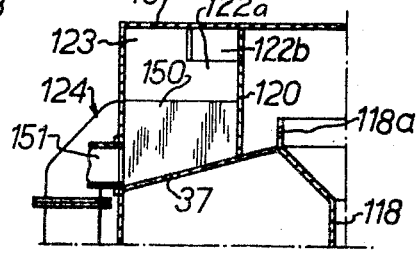

FIGURE 7 is a partial cross-section, on a larger scale, taken substantially along the line V—V of FIGURE 4.

The separator consists of a cylindrical tank 1 with vertical axis, bounded by a jacket 2. The lower part of this jacket is prolonged by a bottom 3 in the form of a truncated cone projecting towards the outside and whose small base is fitted with a hand-controlled valve 4.

The bottom 3 is connected with an intake pipe 5 with tangential aperture, which prolongs a balancing column 6 parallel to the longitudinal axis of the separator 1. The intake pipe 5 ends in the transverse median zone of a compartment 10 which is arranged between the bottom and an intermediate partition 10a in the shape of a truncated cone. This compartment which constitutes the first stage of separation is connected at its upper level with a pipe 10b ending in the upper part of the separator. The cone 10a is prolonged from its small base by a funnel 10c, connecting the stage 10 with an annular chamber 10d, bounded by the cone 10a and a tank in the form of a truncated cone 11 connected to the jacket 2 to constitute with the latter a second stage of separation 15. This stage is connected at its upper level with a pipe 16 which ends at the upper part of the jacket 2 formed by an upper wall 18, but at a lower level than that of the pipe 10b.

The separating stage 15 is bounded, at its upper portion, by an intermediate partition 19 in the form of a truncated cone which is positioned on the inside of the jacket 2 immediately above the inlet orifice of the pipe 16. The cone 19 is prolonged from its small base by a cylindrical funnel 20 opening into the tank 11 to connect the stage 15 with an annular chamber 21 formed between the said cone 19 and a super-imposed tank 22 in the form of a truncated cone. Like the tank 11, the latter bounds, with the corresponding part of the jacket 2, a third separating stage 26, whose upper part is connected with a pipe 27 ending at the upper part of the separator, but at a level immediately below that of the pipe 16.

The stage 26 is likewise bounded, at its upper portion, by an intermediate partition in the form of a truncated cone 30, prolonged by a funnel 31 ending in the tank 22. The funnel 31 connects the second stage 26 with an annular chamber 32 formed between the partition 30 and a tank in the form of a truncated cone 33 forming, with the corresponding part of the jacket 2, a fourth separating stage 36. This stage is blocked at the upper part by an intermediate partition 37 which isolates the different separating stage described above from an upper compartment 100.

The tank 33 is connected with a peripheral diffuser 101, of smaller diameter than that of the jacket 2, and consisting of inclined vertical sheets 104 connecting the annular chamber 32 with the stage 36. This latter has on the inside a filter unit consisting of concentric cylindrical walls, which are coaxial and for instance 3 in number, 105, 106 and 107, which are fixed in some suitable manner so that their common axis coincides with that of the jacket 2. As is shown in FIGURE 5 every wall 105 to 107 is arranged so as to comprise peripherally some swaged parts 108 made so as to show a largely flattened S-shaped section, to provide baffles 111, designed to divide at their level the mixture which traverses them into parallel layers forming a laminar system. Although this is not represented, it is obvious that the swaged parts 108 can be made to extend inwards, in the opposite way to that shown in FIGURE 5.

The concentric peripheral walls 105, 106 and 107 are mounted inside the stage 36 so that the inner channels 112, 113 and 114 which they bound end at their upper part in a common header 115 in the form of an annulus formed by the profile of the wall 37. The header 115 is connected with a pipe 116 fitted with a control valve 117. A funnel 118 bounds the interior of the header 115 to connect the channel 114 with a transfer chamber 119 in which the said funnel opens out by means of a weir 118a. This chamber 119 is in part bounded by a largely semi-circular wall 120 bounding the compartment 100 so as to extend between the header 115 and the upper wall 18 of the separator.

The wall 120 is associated with a radial septum 121 which partially isolates the overflow spout 42 of the pipes 10b, 16 and 27 from the transfer chamber 119. As will be seen in FIGURE 3, the spout 42 is advantageously fitted with a moveable weir 42a, whose vertical position can be regulated initially in order to modify according to the density of the products separated, the section of passage of the pipes 10b, 16 and 27, and moreover the height of overflow in relation to the wall 18. The cross-section of the transfer chamber 119 is bounded by the concave surface of the semi-circular wall 120 and by the corresponding portion of the jacket 2. The wall 120 is also associated at its other end with a septum 122 isolating the transfer chamber 119 from an annular passage 123 bounded between the convex surface of the wall 120 and the corresponding portion of the jacket 2. The partition 122 is prolonged substantially in the diametric axis of the separator to extend inside a discharge box 124 which has a pipe 125 communicating with the transfer chamber 119.

The passage 123, which is isolated from the spout 42 by a radial septum 126, similar to the septum 121, is connected with an inlet pipe 127 joined to the wall 18 which also supports, as may be seen in FIGURE 4, a ventilating nozzle 128. The passage 123 also has, on a level with the discharge tank 124, an opening 130 connecting the said passage with the balancing column 6. As is apparent from FIGURE 7, the passage 123 also has a radial partition 150 which extends between the jacket 2 and the convex surface of the wall 120 from the upper surface of the intermediate partition 37. The position of this partition, whose height is appreciably in excess of that of the weir 118, is selected to isolate partially the discharge tank 124 from the working zone of the passage 123. The latter has besides, upstream of the partition 150, a valve 151 connected to the jacket to open at the lower level of the bottom of the passage 123, which is bounded by the intermediate inclined partition 37.

The portion 122a of the wall 122 has an opening made above the level of the wall 150 to ensure communication with a conduit 122b arranged along a descending slope in the transfer chamber 119 to end in the spout 42 through the septum 121. As seen with respect to FIGS. 3 and 7, the height of the portion 122a determines the total height of the inlet column whose upper end is the compartment 100. The height of the inlet column, therefore, is related to the respective heights of the water outlet column, as determined by the weir 118a and the height of oil outlet column as determined by weir 42a. The arrangement is such that, should large slugs of oil enter the upper compartment 100, the hydrostatic balance achieved between columns 6 and the respective heights of the water outlet column and of the oil outlet column will be shifted, since the total height of column 6 and compartment 100 will be subjected to a lesser hydrostatic head as a result of the addition thereto of the slug or slugs of relatively less dense oil. Since the inlet level normally maintained is to be very nearly the height of wall portion 122a, the diminished hydrostatic head or total reduced average density of column 6 and its upper compartment 100 will result in a sufficient increase of said column's height and the level in upper compartment 100 to force the slug over the top of 122a and, as previously explained, into conduit 122b which communicates with oil outlet spout 42. Thus, due to the structure shown, relatively large discrete amounts of oil which may be fed to the separator are initially shunted from the inlet stream to permit only a mixture of much smaller discrete oil globules to proceed down the inlet column 6 and into the separator.

As is apparent more especially from FIGURE 3, the tanks in the form of truncated cones 11 and 22 are connected respectively peripherally to the jacket 2, in much the same way as with tank 33, by vertical sheets 11b, 22b, which are for preference inclined. These sheets or plates delimit between them equidistant openings forming for each tank a diffuser 131 or 132, causing the corresponding stage of separation to communicate with the annular chamber for supplying the mixture immediately below. As shown in FIGURE 6, the inclination of the sheets 11b, 22b is selected on a level with each tank in order to subject the mixture fed from the annular tank immediately below to a spiral movement according to a laminar system, to ensure good dispersion capable of producing separation by gravity of the water and liquid hydrocarbons.

The separator has, on a level with the semi-circular part of the transfer chamber 119, a rigid support 45, on which a hand control 46 is mounted. This control acts against the action of an elastic return device, on a set of rods 47, which controls simultaneously three valves 11a, 22a and 33a, closing the small bases of the corresponding truncated-conical tanks. The hand control 46 is accessible by an opening 48 made in the upper wall 18 and normally closed by a cover 49.

It is obvious that the valves may assume any desired form to confer on each stage a suitably tight fit in the course of use.

The separator which is described above operates in the following manner:

The mixture to be purified passes via the pipe 127 and flows in the passage in the shape of an annular section 123. Although not shown it is found advantageous to provide at the outlet of the pipe 127 in the passage 123 a transverse grill so as to obtain a good dispersion for assisting the deaerating of the mixture. This passage constitutes an air-extracting device whose horizontal path, which is necessarily traversed, has the effect of ridding the mixture of the air and gases which may have been pumped and these are discharged through the ventilating nozzle 128. This path is likewise provided to bring about a pre-separation of the mixture to be treated, a portion of whose separated hydrocarbons are discharged after passing beyond the radial partition 150, through the conduit 122b to the spout 42, as soon as these hydrocarbons attain sufficient concentration to use the said conduit 122b according, on the one hand, to their lowest density in relation to water, and on the other to their remaining in the upper zone of the tank, through the presence of the balancing column 6.

It should also be pointed out that the passage 123 is formed to hold back the heavy sediment that may be carried along by the mixture. As a matter of fact this sediment is halted in its progress by the presence of the partition 150 behind which it tends to pile up. The discharge of this sediment is effected by the periodic opening of the valve 151.

The deaerated mixture, freed from sediment, after the pre-separation operation passes on a level with the tank 124, through the opening 130, the balancing column 6, and the supply pipe 5. The mixture delivered by this pipe enters the tank 10 in which it is subjected to an initial spiral movement, on account of the tangential inlet of the said pipes in relation to the bottom 3. The hydrocarbons that are separated in this tank are concentrated in the upper part, to be discharged through the pipe 10b. The mixture then passes via the funnel 10c and the chamber 10d and traverses the diffuser 131, whose sheets or plates 11b bring about a helical movement on a laminar basis, which produces a second separation by gravity of the water and the liquid hydrocarbons in the stage 15. Owing to their low density, these hydrocarbons tend to collect at the upper part of the separating stage 15 to use, as they are separated, the pipe 16, through which they are transferred to the spout 42. The latter is connected by the pipe 43 to a storage and recovery tank for the separated hydrocarbons.

The water, which underwent a second treatment in the separating stage 15, then enters successively the stages 26 and 36, in which it is subjected to two further analogous treatments designed to bring about additionally the most complete separation posible of the residual hydrocarbons. Besides the separation by gravity produced on the level of each stage, it should be pointed out that the constitution of the diffusers is selected so that the sheets or plates 11b, 22b and 104 which they comprise produce, at their respective levels, a division of a laminar type which does not impede collection, by slip of the hydrocarbons and by the surface tension rise ("capillary ascent") of the film of hydrocarbons normally attached to the under surface of the corresponding tank, to bring this film to the upper part of the corresponding stage, on a level with which it is discharged, at the same time with the hydrocarbons separated by gravity.

The "capillary ascent" of the film of hydrocarbons coating the different walls of each separating stage is used more especially at the final stage 36 to obtain the substantially complete elimination of the residual hydrocarbons still contained in the water that has undergone three successive treatments, and in particular of the solid particles coated with a gangue of hydrocarbons which keep them in suspension. In fact, this water is compelled to pass through the plates 104 of the diffuser 101 to penetrate the stage 36, inside which it is forced to pass through the baffles 111 of the walls 105, 106 and 107, constituting the filter unit. The plates 104 and the successive baffles 111 are designed to maintain a laminar flow of the mixture, to prevent the detaching of the film of hydrocarbons and particles collected by the walls, and preventing the impedance of the operation of the phenomena of "capillary ascent." The residual hydrocarbons and the particles in suspension are collected by the swaged parts 108 and climb by surface tension to the level of the collector 115, whence they may be discharged through the pipe 116. The water which has been completely purified in the central duct 114 passes through the funnel 118 to overflow into the transfer chamber 119, where it is collected by the pipe 125.

As may be seen from the foregoing, the presence of the plates forming the diffusers 101, 131 and 132, and the swaged parts 108, the baffles of the walls 105 to 107, makes it possible to ensure efficiently, on a level with the stages of separation and of the filter unit, the collection by "capillary ascent" of the films of oil adhering to the walls and that of the residual hydrocarbons still in suspension in the partially purified mixture. Indeed, the plates 11b, 22b and 104 divide at their level the mixture into parallel layers on a laminar basis, which do not impede the phenomenon, taking place continuously, of the "capillary ascent" of the hydrocarbons collected by the said walls. In this way there are obtained very largely complete separation and purification of the water after several consecutive treatments.

As will emerge from the description and the drawings, the separator is constructed in such a way that the overflow 118a constitutes a datum level above which there open the different discharge pipes. The weight of the column of liquid thus determined acts on the secondary columns for supply to the discharge openings, so that there is obtained a permanent automatic operation in the course of which the hydrocarbons are discharged as they are separated. This particular characteristic has moreover a further considerable advantage owing to the fact that the separated hydrocarbons are never stored, even temporarily, before their removal and there is therefore no risk of their becoming agglutinated and forming gels liable to obstruct, at least in part, certain pipes of the separator, thus interfering with the operation of the latter. It is thus possible to carry out a less cumbersome separation, with the same standard of operation. It should furthermore be noted that the separator has no moving part likely to necessitate special maintenance or even the presence of a source of power controlling them.

Another embodiment of the apparatus of the invention is described with reference to FIGURES 8 to 11 of the accompanying drawings.

FIGURE 8 is a diagrammatic section of the elevation of the separator.

Figure 9:
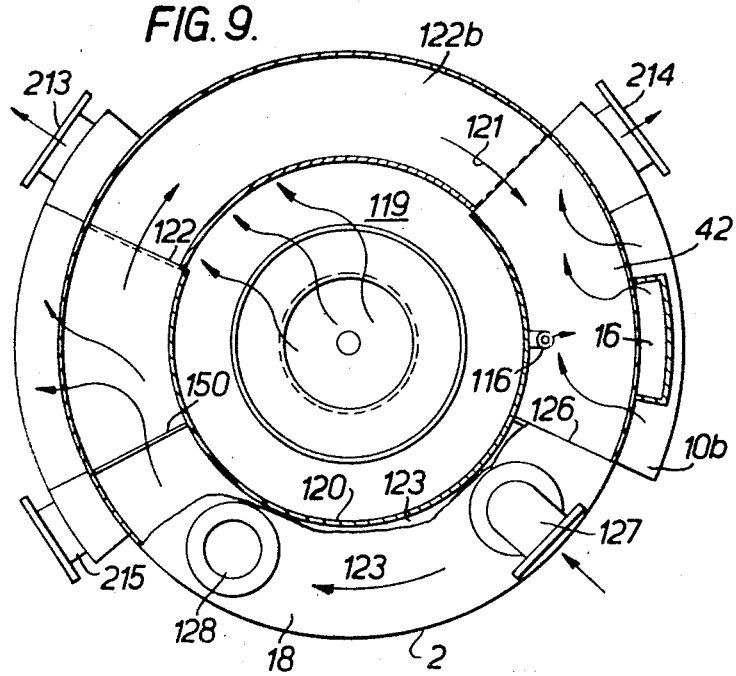

FIGURE 9 is a cross-section largely along line II—II of FIGURE 8.

Figure 10:
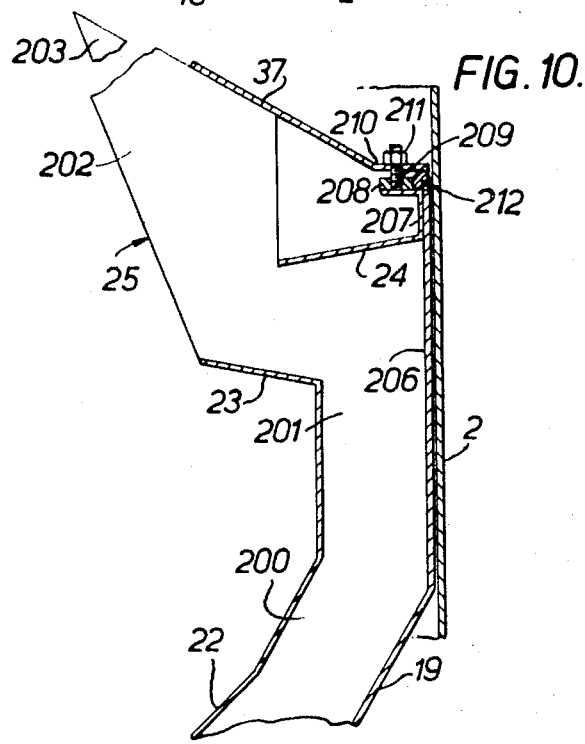

FIGURE 10 is a partial elevation, partly in section, showing on a larger scale one of the characteristics of the separator.

FIGURE 11 is a semi-perspective view on a smaller scale showing more clearly the particular arrangement of certain features characteristic of the invention.

The separator consists of a cylindrical tank 1 with vertical axis bounded by a jacket 2. The lower part of this jacket is fitted with a bottom 3 in the form of a truncated cone, whose small base is joined by a pipe 3a with a valve 4 outside the jacket 2. The bottom 3 is connected with an intake pipe 5 with tangential opening forming the extension of a balancing column 6 parallel to the axis of the separator. The pipe 5 ends in the transverse median zone of a compartment 10 which is provided between the bottom 3 and an intermediate trunco-conical partition 10a. This compartment, which forms the first stage of separation, is connected at its upper level with a pipe 10b ending at the upper part of the separator. The intermediate partition 10a is prolonged from its small base by a funnel 10c connecting the stage 10 with an annular chamber 10d provided between the partition 10a and a cone 11 in the form of a truncated cone forming a second stage of separation 15. Stage 15 is likewise bounded by an intermediate partition 19 in the form of a truncated cone, forming the upper level which is connected by a pipe 16 with the upper part of the separator. The intermediate partition 19, which is extended from its small base by a funnel 20 joining the separating stage 15 with an annular chamber 21 arranged between said partition and a superimposed tray in the form of a truncated cone 22, which constitutes a third stage of separation 26. This stage is terminated at its upper part by an intermediate partition 37 which has a funnel 118 ending in the median zone of the stage 26. The orifice of the funnel 118 on a level with the partition 37 is flanked by a weir 118a which opens in the centre of a transfer chamber 119 bounded by a wall 120 that is substantially semi-circular rising from the partition 37.

As may be seen from FIGURE 9, the wall 120 is associated with a radical septum 121 which isolates the chamber 119 from an overflow spout 42 in which end the pipes 10b and 16, as well as a pipe 116 connected with a header 115 bounded at the upper part of the stage 26 by the profile of the intermediate partition 37. The wall 120 is associated at its opposite end with a radial septum 122 isolating the chamber 119 from a passage of annular section 123 bounded between the convex face of the wall 120 and the corresponding portion of the jacket 2. This passage 123, which is isolated from the spout 42 by a radial septum 126, is connected with an intake pipe 127 ending on a level with the upper wall 18 which moreover supports an aeration nozzle 128. The passage 123 is likewise connected, beyound a radial partition 150, for holding back the heavy sediment, with the balancing column 6 supplying the lower stage 10. The radial septum 122 has an opening made above the level of the partition 150 to provide communication with a pipe 122b arranged along a determined decending slope, in a transfer chamber 119, to end in the spout 42 through the septum 121. 45 denotes a rigid support fixed to the wall 120 to support a hand control 46 acting against the action of suitable elastic devices, on a system of rods 47 actuating simultaneously valves 11a and 21a, closing the small bases of the truncated cones 11 and 22.

Each cone 11 and 22 has on a level with its wide base a peripheral curved flange 12 or 23 which extends in a lower plane than an annular deflector 13 or 24, with which it constitutes a peripheral diffuser 14 or 25. The diffusers 14 and 25 are designed to provide communication between the annular chambers 10d and 21 and the stages 15 and 26, causing the liquid delivered by the said chambers to disperse preferably in accordance with a spiral movement so as to bring about by gravity the separation of the water and the hydrocarbons forming, for example, the mixture to be treated.

The annular chambers 10d and 21 contain vertical vanes 200, which are cut so as to be arranged radially between the intermediate partitions and the corresponding superimposed cones. The vanes 200 are of course shaped so as to occupy the whole of the vertical space allowed between the intermediate partitions and the super-imposed tanks so as to minimise or avoid completely the formation of large vortices which disturb the gravity separation of the liquid mixture. In order to maintain laminar flow the peripheral number of the vanes 200 may be calculated according to the maximum limiting linear speed that can be tolerated by the mixture.

It may be seen from FIGURE 10, each vane 200 has a portion 201 substantially in the shape of an inverted L which is designed to occupy the space arranged for each stage, on the one hand between the cone and the jacket 2, and on the other between the curved edge and the corresponding deflector forming the diffuser. Moreover, every vane 200 is prolonged beyond the portion 201 by a blade 202 substantially in the shape of a harpoon which extends vertically inside the stage superimposed on the corresponding annular chamber, so that the terminal part 203 is arranged as close as possible both to the intermediate partition 19 and to the partition 37.

In the operation of the device that is described above, the mixture to be purified emerging from the passage 123 is delivered by the column 6 into the first stage 10, in which it undergoes a first separation by gravity. The mixture, which is partly purified, is then taken up by the funnel 10c to follow the chamber 10d and penetrate the second stage of separation 15. In the course of its passage inside the chamber 10d, the mixture is divided into laminar layers by the radial vanes 200 which are designed and arranged, as is mentioned above, to minimise the creation of eddy streams. The layers of said mixture are thus subjected to very considerable surface contact owing to the large number of vanes on either side of which the said mixture is caused to discharge the suspended hydrocarbons. Indeed, the vanes 200 tend to collect, by surface free energy the particles in suspension which as the result of the continuity of the film and the density differential, and by entrainment due to the current of the mixture, are then collected towards the portions 201 then towards the blades 202. The arrangement of the latter inside the superimposed stage is selected so that the stream of the mixture in course of separation in the said stage tends to detach the particles collected to project them onto the lower face of the intermediate partition 19. The film thus formed is discharged through effect of capillary and by difference of density towards the discharge pipe 16 ending in the spout 42.

The mixture emerging from the separating stage 15 then passes through the funnel 20 into the second annular chamber 21, in which it is subjected by the vanes 200 to a further separation of the residual hydrocarbons which are collected by surface tension afterwards to be taken to the level of the discharge header 115 through effect of capillarity.

As may be seen from the foregoing, the presence of the radial blades 200 can enable one to increase the separation of each stage by effectively bringing into play the effects of surface tension and capillarity, but without disturbing the flow of the mixture to be treated.

The special arrangement described above is moreover advantageously utilised to simplify design and to assist the execution of the separator. Indeed, the presence of the vanes 200 makes it possible to provide for each stage a self-contained unit consisting of the assembly, for instance by welding, of the lower partition, the radial vanes and the truncated cone bounding the base of the superimposed separating stage. Each unit thus formed, which of course embodies the annular deflector needed to form the diffuser, is inserted in the cylindrical jacket, in which it is fixed permanently or rigidly. As will be seen in FIGURE 8, in the case of the separator having three stages of separation, and therefore two superimposed self-contained units, it may be an advantage to fix by welding the lower unit since the latter can be accessible on a level with the separating stage 10 through an inspector door or manhole 204 provided for this purpose in the jacket 2. In such a case the latter is provided, on its internal peripheral face, with a support 205 fixed at a suitable level to constitute an annular stop on which the upper assembly rests. The fixing of this assembly, to avoid possible shifts, for instance as a result of vibrations, can be ensured, as represented in FIGURE 10. According to the latter the intermediate wall 19 is prolonged by a cylindrical wall 206 of diameter very close to that of the jacket 2, and inside which is attached the annular deflector 24. This wall 206 is provided in its upper part with a reinforcing angle iron 207 on the horizontal wing of which is fixed a crown 208. The latter is provided with threaded bolts 209 designed to pass through a rigid peripheral edge 210 formed from the intermediate partition 37. The clamping of the edge 210 to the crown 208 by means of bolts 211, makes it possible to knit together effectively the partition 37, the self-contained assembly comprising the vanes 200 and the jacket 2, while ensuring perfect tightness between the surfaces in contact through the interposition of a toric joint placed between the angle iron 207, the rigid peripheral edge 210 and the jacket 2.

Besides the advantages of the simplification of execution and assembly, it must be pointed out that the arrangement described above makes it possible, through the presence of moving separating units, to further the possible cleaning operations of the different stages of separation. It is moreover possible to provide a jacket 2 in one piece, to which are attached at the level selected, sheaths for connecting the outer peripheral surface of the said jacket, with the balancing column 6 and the discharge pipes 10b and 16. It likewise becomes possible to adapt directly connecting pipes 213, 214, 215 respectively for ensuring the discharge of the purified water, that of the separated hydrocarbons and the elimination of the heavy sediments held back behind the screen 150. Such a design moreover has another advantage owing to the fact that the upper stage, incorporated directly with the jacket 2, is in part thermally insulated, which makes it possible to avoid the formation of frost by the cooling of the treated mixture, more especially on a level with the discharge pipe 16.

This preferred embodiment is not confined to the particular apparatus which is represented and described in detail, because various modifications may be made to it without departing from its scope. In particular, the separator may have any number of separating stages bounded, inside a common jacket, by a corresponding number of assemblies consisting of an intermediate partition, the radial vanes and an upper tray. In such a case, the intermediate assemblies arranged between the lower assembly which is welded and the upper assembly which is movable, can be held respectively by means of the system of rods 47 governing the corresponding valves. Likewise, the lower separation assembly may consist of a basin in the form of a truncated cone fitted with radial blades designed to rest on an intermediate partition attached by welding to the inside of the jacket to bound the first stage of separation.

What is claimed is:

1. A separator suitable for separating a mixture of liquids of different densities comprising an outer jacket, a plurality of downwardly sloping trays spaced vertically apart, arranged in pairs one above each other, in which the periphery of the upper tray of each pair of trays has a passageway associated therewith through which liquid can flow from the underside of said upper tray to the space above said tray, the lower tray of each pair of trays has an aperture in the lower region thereof, the trays being spaced so that the level of each passageway is above the level of the aperture of the tray above, in which the lower tray of each pair of trays is sealingly connected to the outer jacket and discharge outlets are provided for communicating the interior of the jacket near the underside of each lower tray with the outside of the jacket, and in which there is a feed inlet positioned so that incoming liquid is fed in at a level below the lower tray of the lowest pair of trays, and wherein there is an upper outlet for liquid positioned above the upper tray of the uppermost pair of trays.

2. A separator as claimed in claim 1 in which there is a valve in the lower region of the upper tray of each pair of trays.

3. A separator as claimed in claim 1 in which the upper outlet is an upwardly extending funnel, a transversely extending partition is sealingly connected to the upper part of the funnel near the top thereof, and is sealingly connected to the outer jacket so that liquid flows upwardly over the top of the funnel over the partition and out of the separator through a further outlet.

4. A separator as claimed in claim 1 in which a separate conduit extending upwardly above the outlet is separately connected to each discharge outlet, the orifices of these conduits being at different levels so that the liquid flowing in these conduits and out through the orifices is in hydrostatic balance with the liquid flowing out of the upper outlet.

5. A separator as claimed in claim 1 which comprises a plurality of centrally directed blades in the spaces between the upper and lower tray of each pair of trays, said blades extending upwardly and inwardly into the spaces below the lower tray of each pair of trays, each blade terminating at a point close to the underside of a lower tray.

6. A separator as claimed in claim 1 in which the upper outlet is positioned below the level of the passageway associated with the upper tray of the uppermost pair of trays.

7. A separator according to claim 6 in which the position of the upper outlet determines the height of a column comprising a liquid of greater density and the level of the passageway associated with the upper tray determines the height of a column comprising a liquid of lesser density, and means for defining the height of a feed stream column of said mixture of liquids above said feed inlet, said feed stream height being in relation to the heights of said liquid columns respectively of lesser and greater density, said means determining the height of said feed stream further permitting overflow in excess of said height to pass from said separator, the height of said feed stream being adjusted to accommodate a range of densities of said mixture up to the overflow point, intermittent decreases in feed stream columnar density as a result of the introduction thereto of discrete slugs of said liquid of lesser density causing increases in column height and overflow of said slugs.

8. A separator as claimed in claim 1 in which a deaerator is connected to the feed inlet so that the feed-stream is freed of gas before being introduced into the space below the lower tray of the lowest pair of trays.

9. A separator as claimed in claim 8 in which the deaerator is situated at the top of the separator and a conduit extending substantially throughout the height of the separator connects the deaerator with the feed inlet.

10. A separator suitable for separating a mixture of liquids of different densities comprising an outer jacket, a plurality of downwardly sloping trays spaced vertically apart, arranged in pairs one above each other, in which the periphery of the upper tray of each pair has a passageway associated therewith through which liquid can flow from the underside of said upper tray to the space above said tray, the lower tray of each pair of trays has an aperture in the lower region thereof, the trays being spaced so that the level of each passageway is above the level of the aperture of the tray above, in which the lower tray of each pair of trays is sealingly connected to the outer jacket and discharge outlets are provided for communicating the interior of the jacket near the underside of each lower tray with the outside of the jacket, and in which there is a feed inlet positioned so that incoming liquid is fed in at a level below the lower tray of the lowest pair of trays, and wherein there is an upper outlet for liquid positioned above the upper tray of the uppermost pair of trays, and wherein diffuser elements are provided at the ends of said passageways, said diffuser elements comprising a series of inwardly directed strips fixed to the perimeter of the upper trays.

11. A separator as claimed in claim 10 in which the strips are set at an angle to the line joining the strip with the central axis of the separator so that liquid flowing between the strips undergoes a helical flow into the space above the upper trays.

12. A separator as claimed in claim 10 which comprises a collector passage at the top of the separator, a conduit connected to the feed inlet, a weir positioned adjacent to the top of the conduit so that any of the feed liquid already separated by gravity passes over the weir into the collector passage and the remainder of the feed liquid passes into the feed inlet via the conduit.

13. A separator as claimed in claim 10 in which there is a downwardly depending funnel in the lower region of the lower tray in each pair of trays.

14. A separator as claimed in claim 10 in which the upper outlet is an upwardly extending funnel, a transversely extending partition is sealingly connected to the upper part of the funnel near the top thereof, and is sealingly connected to the outer jacket so that liquid flows upwardly over the top of the funnel over the partition and out of the separator through a further outlet.

15. A separator as claimed in claim 10 in which a separate conduit extending upwardly above the outlet, is separately connected to each discharge outlet, the orifices of these conduits being at different levels so that the liquid flowing in these conduits and out through the orifices is in hydrostatic balance with the liquid flowing out of the upper outlet.

16. A method of separating a mixture of liquids of different densities in which said mixture is continuously fed into the lowest separation stage of a separator comprising a plurality of separation stages, each stage being bounded by a separate pair of downwardly sloping trays spaced vertically apart, and in which at each separation stage:
 (1) the lighter liquid which separates is allowed to rise up and to pass out of the separator through a discharge outlet positioned near the top of the separation stage, and
 (2) the denser liquid which separates is allowed to pass through an aperture in the lowest part of the tray forming the upper boundary of the separation stage, and thereafter to pass through the space between two separation stages and to enter the next separation stage above through a passageway which is associated with the periphery of a tray and which is positioned at a level above the aperture in the tray forming the upper boundary of said next separation stage, and in which at the top separation stage the separated denser liquid is removed through an upper outlet.

17. A method as claimed in claim 16 in which the liquid mixture is deaerated before being fed into the lowest separation stage.

18. A method as claimed in claim 17 in which the lighter liquid after passing through the separate discharge outlets flows through separate upwardly extending conduits connected to the outlets, the conduits terminating in orifices which are arranged so that the lighter liquid in each conduit is in hydrostatic balance with the denser liquid flowing through the upper outlet.

19. A method as claimed in claim 18 in which water is separated from a mixture of oil and water.

References Cited

UNITED STATES PATENTS

| 2,546,269 | 3/1951 | Lovelady | 55—175 |
|---|---|---|---|
| 2,995,202 | 8/1961 | Glasgow | 55—175 |
| 3,273,318 | 9/1966 | Meyer | 55—175 |
| 1,844,643 | 2/1932 | D'Yarmett | 159—6 |
| 2,604,956 | 7/1952 | Israel | 55—319 |
| 3,043,072 | 7/1962 | Walker et al. | 55—175 |
| 3,110,646 | 11/1963 | Mayhew et al. | 55—175 |
| 3,255,805 | 6/1966 | Bechard | 159—6 |

FOREIGN PATENTS

| 170,441 | 9/1934 | Switzerland. |
|---|---|---|
| 1,031,065 | 6/1963 | France. |

REUBEN FRIEDMAN, Primary Examiner

CHARLES N. HART, Assistant Examiner

U.S. Cl. X.R.

55—176